US007191934B2

(12) United States Patent
Miller et al.

(10) Patent No.: US 7,191,934 B2
(45) Date of Patent: Mar. 20, 2007

(54) TECHNIQUE FOR CREATING INCIDENT-SPECIFIC CREDENTIALS AT THE SCENE OF A LARGE-SCALE INCIDENT OR WMD EVENT

(75) Inventors: Russell L. Miller, Traverse City, MI (US); Michael A. Whelan, Traverse City, MI (US)

(73) Assignee: Salamander Technologies, Inc., Traverse City, MI (US)

( * ) Notice: Subject to any disclaimer, the term of this patent is extended or adjusted under 35 U.S.C. 154(b) by 0 days.

(21) Appl. No.: 10/892,857

(22) Filed: Jul. 16, 2004

(65) Prior Publication Data

US 2005/0017070 A1 Jan. 27, 2005

Related U.S. Application Data

(60) Provisional application No. 60/488,762, filed on Jul. 21, 2003.

(51) Int. Cl.
*G06F 7/00* (2006.01)
(52) U.S. Cl. ................... 235/376; 235/380; 235/487
(58) Field of Classification Search ........ 235/375–377, 235/380, 385, 462.46, 487; 902/4–7
See application file for complete search history.

(56) References Cited

U.S. PATENT DOCUMENTS

| | | | |
|---|---|---|---|
| 5,113,445 A | 5/1992 | Wang | |
| 5,243,655 A | 9/1993 | Wang | |
| 5,266,780 A | 11/1993 | Kamata et al. | |
| 5,291,399 A | 3/1994 | Chaco | |
| 5,337,361 A | 8/1994 | Wang et al. | |
| 5,343,446 A | 8/1994 | Simmons et al. | |
| 5,393,965 A | 2/1995 | Bravman et al. | |
| 5,399,846 A | 3/1995 | Pavlidis et al. | |
| 5,406,491 A | 4/1995 | Lima | |
| 5,459,657 A | 10/1995 | Wynn et al. | |
| 5,522,623 A * | 6/1996 | Soules et al. ................. 283/91 |
| 5,573,278 A | 11/1996 | Clemens | |
| 5,596,652 A | 1/1997 | Piatek et al. | |
| 5,635,012 A | 6/1997 | Belluci et al. | |
| 5,793,882 A | 8/1998 | Piatek et al. | |
| 5,801,364 A | 9/1998 | Kara et al. | |
| 5,995,077 A | 11/1999 | Wilcox et al. | |

(Continued)

OTHER PUBLICATIONS

Financial World®, Srikumar S. Rao, "Tomorrow's Rosetta Stones," Nov. 22, 1994 (pp. 70-72).

(Continued)

*Primary Examiner*—Michael G. Lee
*Assistant Examiner*—Edwyn Labaze
(74) *Attorney, Agent, or Firm*—Price, Heneveld, Cooper, DeWitt & Litton, LLP

(57) ABSTRACT

An incident management system includes a check-in computer system and a portable data terminal. The check-in computer system is utilized to read information from a plurality of pre-existing identification (ID) cards and utilize at least a portion of the information to create an incident-specific credential for each person responding to an incident. The portable data terminal is configured to read the incident-specific credentials and communicate with the check-in computer system to provide current assignments of personnel responding to an incident such that the personnel can be tracked.

29 Claims, 4 Drawing Sheets

U.S. PATENT DOCUMENTS

| | | | |
|---|---|---|---|
| 6,029,889 A * | 2/2000 | Whalen et al. | 235/380 |
| 6,084,513 A | 7/2000 | Stoffer | |
| 6,115,361 A * | 9/2000 | Fredericks et al. | 370/242 |
| 6,305,605 B1 * | 10/2001 | Goetz et al. | 235/385 |
| 6,421,650 B1 * | 7/2002 | Goetz et al. | 705/3 |
| 6,499,658 B2 * | 12/2002 | Goetz et al. | 235/385 |
| 6,751,805 B1 * | 6/2004 | Austion | 2/94 |
| 6,761,312 B2 * | 7/2004 | Piatek et al. | 235/385 |
| 6,796,494 B1 * | 9/2004 | Gonzalo | 235/380 |
| 6,824,065 B2 * | 11/2004 | Boone et al. | 235/492 |
| 6,857,210 B2 * | 2/2005 | Santa Cruz | 40/124.06 |
| 7,027,955 B2 * | 4/2006 | Markwitz et al. | 702/187 |
| 2002/0024507 A1 | 2/2002 | Boone et al. | |
| 2002/0118118 A1 * | 8/2002 | Myllymaki et al. | 340/686.1 |
| 2003/0052788 A1 * | 3/2003 | Kwong-Tai Chung | 340/573.1 |
| 2003/0125998 A1 * | 7/2003 | McKenney et al. | 705/7 |
| 2003/0196097 A1 * | 10/2003 | Korosec et al. | 713/185 |
| 2003/0225612 A1 * | 12/2003 | DeSimone et al. | 705/13 |
| 2004/0078223 A1 * | 4/2004 | Sacco et al. | 705/2 |
| 2004/0105529 A1 * | 6/2004 | Salvucci et al. | 379/45 |

OTHER PUBLICATIONS

ID Systems, Craig Harmon, "Two-Dimensional Standards and ISO Update," Nov. 1994 (pp. 22, 24 and 100).

Traverse City Record Eagle, T.M. Shultz, "GT County Firefighters to Test New Bar Coding Data System," Jul. 6, 1994 (1 page).

Maryland/DC Firefighter, Brad Schnaidt, "The Fire Service and Barcodes-Approaching the 21$^{st}$ Century," vol. 9, No. 1, Autumn 1994 (pp. 155, 157 and 159).

The New York Times, Barnaby J. Feder, "For Bar Codes, an Added Dimension," Apr. 24, 1991 (2 pages).

Automatic I.D. News, Brad Schnaidt, "In the Line of Fire: 2-D Bar Codes Track Whose Battling Fires and Provide Rescue Workers with Firefighter's Medical History," Aug. 1994 (pp. 18-19).

Fortune, Mark Alpert, "Building a Better Bar Code," Jun. 15, 1992 (1 page).

* cited by examiner

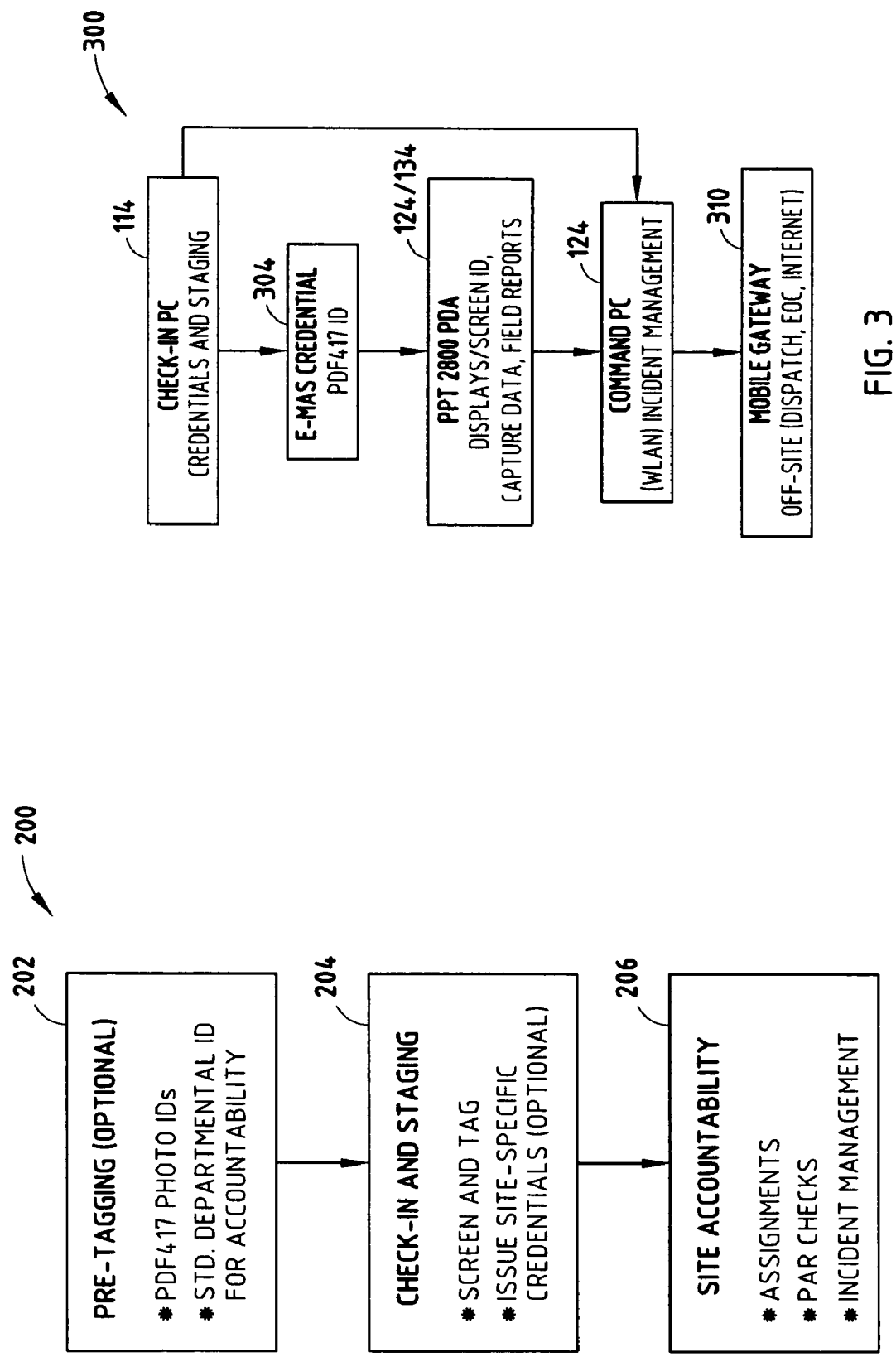

FIG. 4

FIRE-TRAX ON SCENE COMMAND — 400

PAR | 10172001-1... 10172001-1... | 28

- START TIMER
- QUAL REPORT
- INCIDENT REPORT
- END INCIDENT

- COMMAND LOG
- RUN REPORT
- INCIDENT DETAILS
- PRINT BARCODES

ON SCENE
4 PEOPLE
3 EQUIPMENT
JERMIAH HUSS

REHAB
6 PEOPLE
0 EQUIPMENT
JERMIAH HUSS

TRAUMA CENTER
0 PEOPLE
2 EQUIPMENT
JERMIAH HUSS

PALM JEREMIAH NUSA -- ASSIGNMENT REHAB

| LAST NAME | FIRST NAME | TIME IN |
|---|---|---|
| SMITH | JOE | 5:15:20 PM |
| JONES | FRED | 5:20:12 PM |
| BROWN | JOHN | 3:20:26 PM |
| GREEN | MARY | 3:30:04 PM |
| WHITE | BOB | 3:39:34 PM |

PALM JEREMIAH NUSA -- ASSIGNMENT ON SCENE

| LAST NAME | FIRST NAME | TIME IN |
|---|---|---|
| MILLER | MARY | 4:40:04 PM |
| JONES | SCOTT | 4:51:34 PM |

PALM JEREMIAH NUSS ASSIGNMENT ON SCENE

| MODAL | DESTINATION | TIME IN |
|---|---|---|
| 123456789 | 1234567891234S6 | 10:05:26 AM |
| SMITH | DESCRIPTION | 10:05:21 AM |
| TYPE 2 | FIRE ENGINE | 3:39:34 PM |

PALM JEREMIAH NUSS ASSIGNMENT TRAUMA CENTER

| MODEL | DESCRIPTION | TIME IN |
|---|---|---|
| TRUCK | TYPE II | 4:04:20 PM |
| TYPE 4 | FIRE ENGINE | 4:04:27 PM |

US 7,191,934 B2

TECHNIQUE FOR CREATING INCIDENT-SPECIFIC CREDENTIALS AT THE SCENE OF A LARGE-SCALE INCIDENT OR WMD EVENT

CROSS-REFERENCE TO RELATED APPLICATION

This application claims the benefit of U.S. Provisional Patent Application Ser. No. 60/488,762, entitled SYSTEM AND METHOD FOR CREATING INCIDENT SPECIFIC CREDENTIALS AT THE SCENE OF A LARGE-SCALE INCIDENT OR WMD EVENT, filed Jul. 21, 2003, the entire disclosure of which is hereby incorporated herein by reference.

BACKGROUND OF THE INVENTION

The present invention is generally directed to management of a large-scale incident or weapons of mass destruction (WMD) event and, more specifically, to the implementation of incident-specific credentials for responders to a large-scale incident or WMD event.

The recent Sep. 11, 2001, terrorist attacks have highlighted various deficiencies in how emergency or civilian responders to, or victims of, a large-scale incident are tracked at the scene of an incident. In general, such tracking has been required for both logistics and site security. The current state-of-the-art has been to login personnel or victims at one or more staging points. At login, a record of the person has been created either using pencil and paper or a computerized log. A temporary ID has then been issued or a designator (e.g., color sticker, grease pen markings) applied to a pre-existing ID to indicate the status of a person (e.g., approved to be on-site, triage status, etc.). The current method is time-consuming, non-standardized and prone to human error.

What is needed is a technique that accounts for personnel and/or victims at a scene of an incident that is standardized, efficient and less prone to human error.

SUMMARY OF THE INVENTION

According to one embodiment of the present invention, an incident management system includes a check-in computer system and a portable data terminal. The check-in computer system reads information from a plurality of pre-existing identification (ID) cards and utilizes at least a portion of the information to create an incident-specific credential for each person responding to an incident. The portable data terminal is configured to read the incident-specific credentials and communicate with the check-in computer system to provide current assignments of personnel responding to an incident such that the personnel can be tracked.

According to another embodiment of the present invention, an incident management system includes a check-in computer system, a portable data terminal and a command computer system. In this embodiment, the check-in computer system reads information from a plurality of pre-existing identification (ID) cards. At least a portion of the information is then utilized to create an incident-specific credential for each person responding to an incident. The portable data terminal is configured to read the incident-specific credentials. The command computer system is in communication with the terminal, which communicates with the command computer system to provide current assignments of personnel responding to an incident such that the personnel can be tracked.

These and other features, advantages and objects of the present invention will be further understood and appreciated by those skilled in the art by reference to the following specification, claims and appended drawings.

BRIEF DESCRIPTION OF THE DRAWINGS

FIG. 2 is a block diagram of exemplary E-MAS functionality, according to one embodiment of the present invention;

FIG. 3 is a site accountability block diagram, according to one aspect of the present invention; and FIG. 4 is an exemplary command computer system main screen.

DETAILED DESCRIPTION OF PREFERRED EMBODIMENTS

Figure 1:
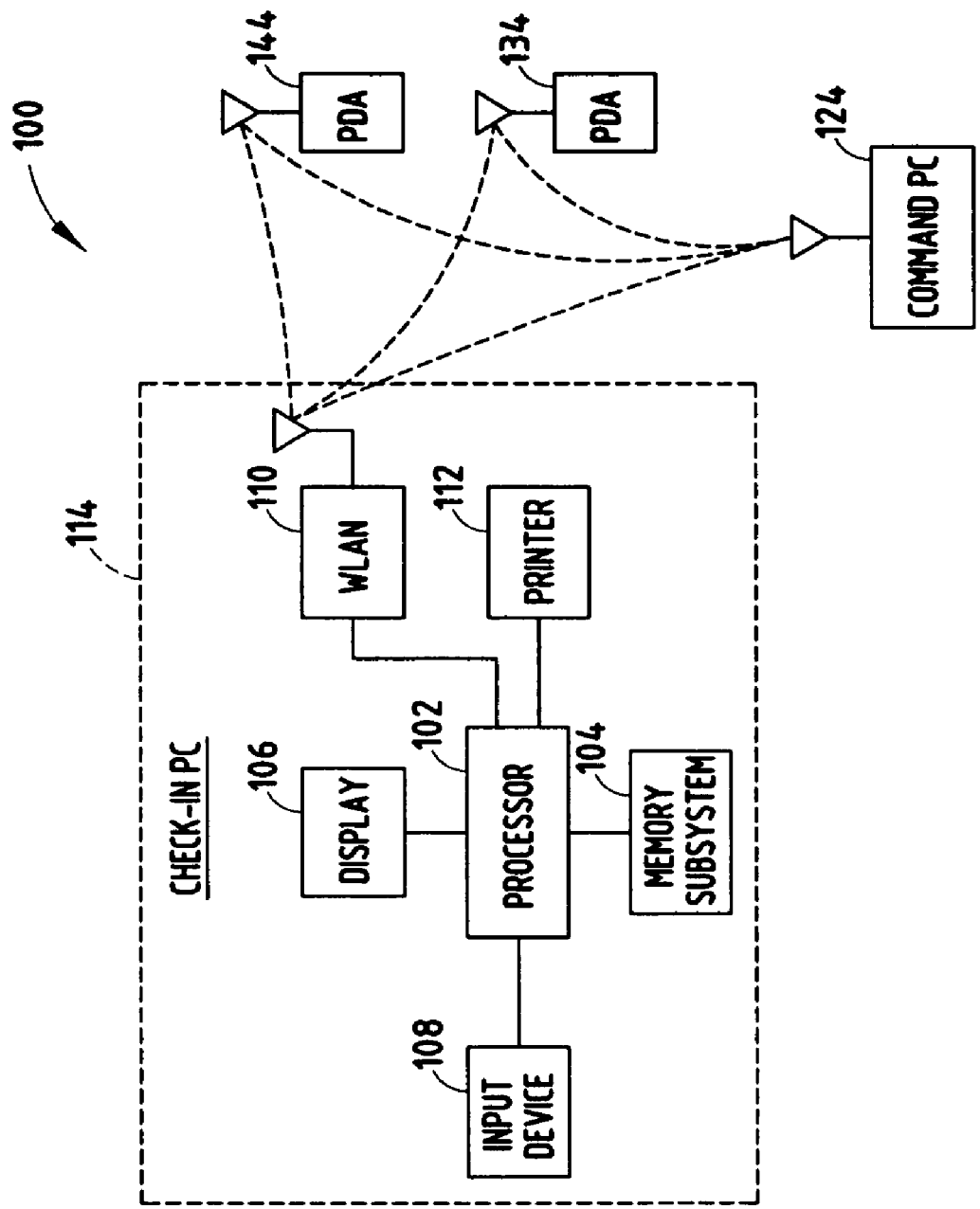
FIG. 1 is an electrical block diagram of an exemplary Emergency Management Accountability System (E-MAS), according to one embodiment of the present invention.

According to various embodiments of the present invention, incident-specific and time-limited credentials may be created to identify various levels of authority with respect to: 1) attendance at a site or incident (either global or sector-specific); 2) performance of specific functions; and 3) priority of treatment. According to one embodiment of the present invention, incident-specific identifications (IDs)/credentials are created in the field by copying data from pre-existing, machine-readable IDs that the person or victim has brought to the site (e.g., a driver's license, a military ID, a Fire-Trax tag, etc.). According to another embodiment of the present invention, "authorities" and/or "time limits" may be incorporated into the credential, e.g., in human-readable text and/or in a machine-readable media. It should be appreciated that the "time limits" may also be thought of as an authorization.

According to yet another embodiment of the present invention, a biometric is incorporated into the ID (e.g., a person's photograph) to positively identify the person. For example, when a firefighter shows up at a staging area of a major incident, the firefighter's ID (e.g., including a PDF417 bar code) is scanned and pertinent data automatically populates a standard credential template. The system operator selects the "authority" of the credential by either using a system default (e.g., permitted on-scene), and/or qualifying the permission based on a sector (e.g., rehabilitation only) and/or time limit (e.g., Jul. 24, 2003, only) and/or function (e.g., emergency medical service (EMS) only). It should be appreciated that it may be advantageous to implement other authorities within the credential depending upon the circumstances. The system operator can also take a photograph to provide a positive biometric ID. The new ID tag/credential is then created using a label printer, photo-ID card system or other tagging system. Alternatively, an existing photograph, such as a driver's license photograph, may be used in conjunction with the ID tag/credential. In this embodiment, the existing photograph and the ID tag/credential may be placed in a pocket of a plastic pouch so that a new photograph does not have to be taken. When implemented with a plastic pouch having a single pocket, a front view may show the ID tag/credential and a back view may show an existing photograph. Alternatively, both the ID tag/credential and the existing photograph may be positioned in separate pockets of a plastic pouch for easier viewing.

In an advanced application, the qualifications embedded in the pre-existing ID tag can automatically assign a permission level (e.g., a firefighter with EMS training can automatically be permitted to perform EMS functions). In addition, machine-readable biometrics (e.g., photographs) embedded in the pre-existing ID tags can be used for the new ID/credential. Preferably, the pre-existing ID tags (e.g., PDF417, touch buttons, RFID, etc.) brought to the scene include high-capacity data files that already contain pertinent personal information and qualifications. However, the same method can be used with low-capacity machine-readable ID tags, such as linear bar codes or magnetic-strips, on driver's licenses or credit cards. Various embodiments of the present invention provide a fast, accurate and standardized method for establishing site security at large-scale incidents, such as natural disasters and weapons of mass destruction (WMD) events. It should be appreciated that various embodiments of the present invention may also provide a quick and accurate method for tagging victims of a mass casualty incident (MCI).

Referring to FIG. 1, an electrical block diagram of an exemplary emergency management accountability system (E-MAS) 100 is depicted. As is shown in FIG. 1, a check-in personal computer (PC) 114 includes a processor 102 coupled to a memory subsystem 104. The processor 102 is also coupled to a display 106, a printer 112 and an input device 108. The processor 102 may be a general purpose processor, a microcontroller (i.e., an execution unit with memory, etc., integrated within a single integrated circuit), an application specific integrated circuit (ASIC), a programmable logic device (PLD) or a digital signal processor (DSP). The memory subsystem 104 includes an application appropriate amount of volatile and non-volatile memory. The PC 114 may communicate with a number of other devices, such as a personal digital assistant (PDA) 144, a PDA 134 and a command PC 124, via a wireless local area network (WLAN) card 110. For systems that do not implement a command PC 124, the check-in PC 114 can function as both a command PC and a check-in PC. As is discussed in further detail below, the PDAs 134 and 144 are utilized at the incident to check-in and account for personnel and/or victims at various locations at the site. The input device 108 may take various forms, such as a barcode reader wand, and may include a keyboard, as well as a mouse. The printer 112 may also take various forms, such as a laser printer and/or a label printer. When the command PC 124 is implemented, the command PC 124 receives signals from the PDAs 134 and 144 and receives information from the check-in PC 114, such that the command PC 124 can track responders at the incident.

Figure 1B:
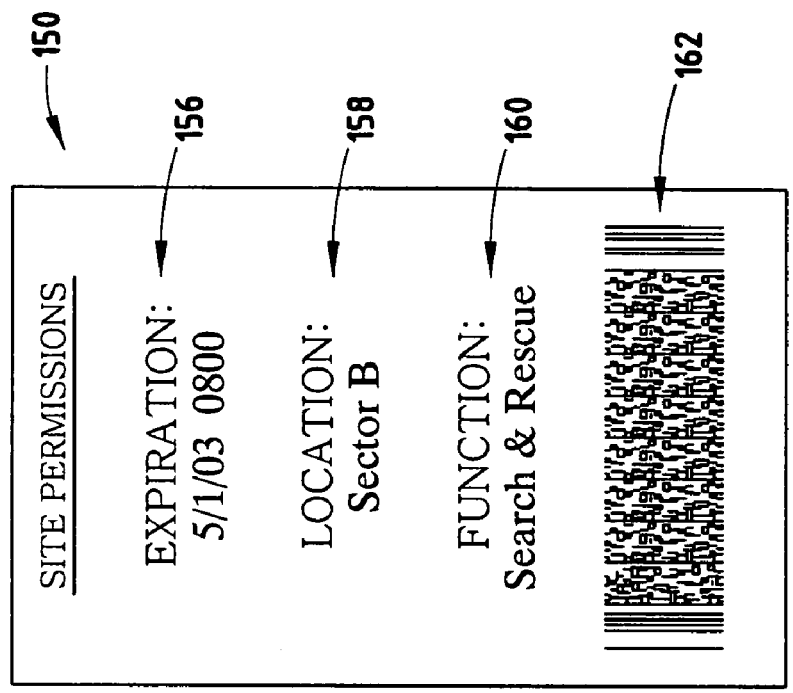
FIG. 1B is a back view of the E-MAS credential of FIG. 1A.
Figure 1A:
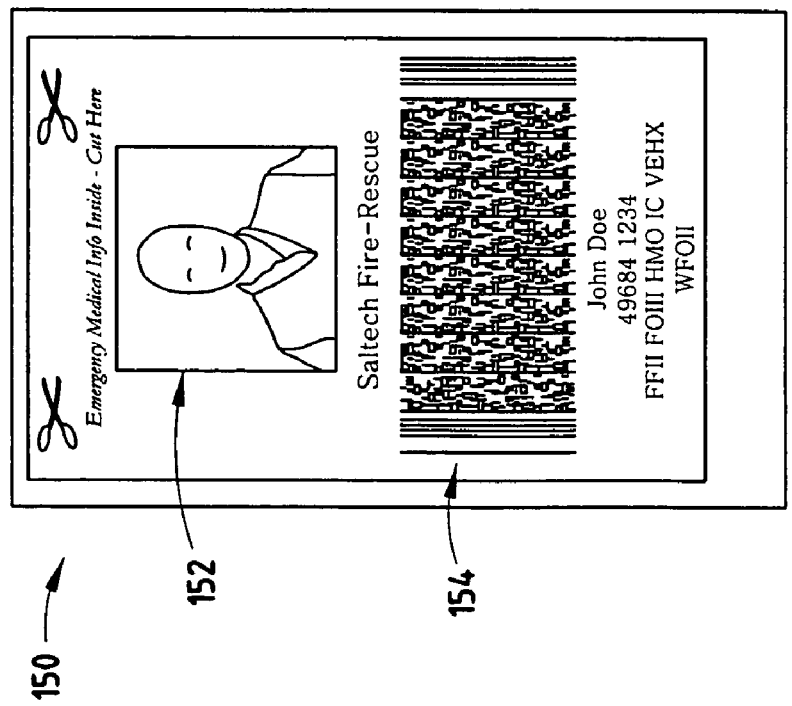
FIG. 1A is a front view of an exemplary E-MAS credential, configured according to one embodiment of the present invention.

With reference to FIGS. 1A and 1B, a front and rear of an exemplary E-MAS credential are depicted. As is shown in FIG. 1A, the front of a credential 150 includes a photograph 152 and a barcode 154, as well as textual information, such as the responder's name and whom the responder is affiliated with. Referring specifically to FIG. 1B, the rear of the credential 150 may include an expiration date 156, an assigned function 160, a location 158 and a barcode 162, which may include various additional information.

Referring to FIG. 2, an Emergency Management Accountability System (E-MAS) is designed to perform a number of functions 200, which include rapid check-in and staging 204 and site accountability 206 for responders at the site of a large-scale incident, such as a WMD event or natural disaster. According to one aspect of the present invention, E-MAS is used to create incident-specific credentials that include "site permissions" to be on-site for a specific time frame, at a specific location and/or perform a specific function. According to one embodiment, PDF417 bar codes on the credential provide portable data files that travel with the responder throughout the incident, providing on-the-spot personnel data. Portable Data Terminals (e.g., PDAs) deployed at the incident can provide remote location credential checks and entry-point accountability, while transmitting this information back to the command post for total incident coordination. In this embodiment, the command post may feature a field PC (communicating over a wireless local area network (WLAN)) to monitor personnel and unit deployments.

According to another embodiment of the present invention, a system function of pre-tagging (optional) 202 may be employed. According to this embodiment, all area responders are issued standard PDF417 photo ID tags or cards, which serve as departmental IDs and provide for accountability during routine incidents. The PDF417 is a portable data file containing, for example, name, rank, ID number, department, qualifications, certifications and optional emergency medical/contact information. Depending on the level of site security desired, this ID can be used "as is" for accountability purposes or its data can be rapidly and accurately captured to populate a template of a new incident-specific credential.

At check-in, all personnel are screened for credentials. If pre-tagged with an E-MAS-compatible PDF417 photo ID, they may gain access to the site, as is. Alternatively, if an incident-specific credential is being enforced, a bar code scanner tethered to a PC can be used to accurately and quickly scan IDs to capture data into a new credential template. It should be appreciated that a PDF417 equipped state driver's license can be used for data entry. If the responder has not been pre-tagged, the system operator may key-in data. From a drop-down list, the operator may select the type of site access for the individual. That is, access based on a time, and/or location, and/or functional or unlimited basis may be established. These "permissions" can be indicated in human-readable text on the tag, as well as in a machine-readable format, e.g., a PDF417 bar code. The new credential can then be printed from a printer, e.g., a laser printer, at the site. A digital camera may also be used to provide a photograph for inclusion on the credential. Color-coding of the tag stock is also an option. Once personnel have been checked-in, they are automatically "staged" in the system as available resources, either as part of a crew or as an individual.

With reference to FIG. 3, a system 300 may be employed that provides accountability and security at four (4) levels: ID tag 304, at the PDA 124/134, at the Command PC 124 and Off-Site. In this embodiment, the ID tag 304 provides a photo-ID and "permissions" in human-readable text so that site officials can validate site access. A personal digital assistant (PDA) 124/134 may be used to scan the machine-readable information, e.g., PDF417 bar codes, to display a person's data, validate the person's permissions and assign or reassign the person. When the backside "permissions" bar code is scanned, an alarm may sound if the permissions do not meet the programmed rules of the PDA (i.e., expiration, location, function) 124/134. The PDA 124/134 keeps a running tally of the number of personnel being tracked and their locations or assignments. In this manner, a Personnel Accountability Report (PAR) check may be conducted at any time. The PDA 124/134 may provide a "qualifications search" where individuals are located based on their qualifications and a "history report" showing all responders and their assignment history at a site. The assignment data in the PDA 124/134 can then be communicated to the command PC 124 via traditional cradle/cable upload or, if desired, via 802.11 radio frequency communications. Implementing one or more PDAs is desirable for providing credential checks and accountability at remote locations. The command PC 124 may be used as the nerve center of the system 300 and, in this manner, serve as a hub of a wireless LAN and collect data from the check-in PC 114, the PDAs 124/134 or directly from a tethered scanner. The command PC 124 provides a schematic of all assignments so a commander can quickly visualize what forces are deployed. This allows a PAR check to be readily conducted for any assignment or for the total site. According to various embodiments, check-ins, assignments and checkouts are time and date stamped for complete reporting capabilities. Further, a command log may be created, which automatically summarizes key events, such as PAR checks and completed objectives. Data from the command PC 124 may also be sent upstream to central dispatch, an EOC or the Internet using a mobile gateway 310 and standard communication protocols.

The benefits of E-MAS include: 1) speed—E-MAS provides a rapid tagging capability when pre-existing PDF417 ID tags or driver's licenses are scanned, expedites the data entry process while virtually eliminating human error and reduces or eliminates bottlenecks at check-in; 2) standardization—E-MAS produces a standard ID tag that can be used by all responders, which makes site security and accountability processes easier; 3) security—since data can be captured from pre-existing IDs, e.g., E-MAS ID tags or state driver's licenses, the data captured should be valid and a photograph on the ID can provide additional security and the "site permission" on the E-MAS credential provides on-the-spot credential validation and accountability; 4) simplicity—the E-MAS system operates on simple "aim and shoot" bar coding principles that can be learned in a matter of minutes with simplification being the overriding design objective of the system; 5) scalability—E-MAS can scale-up to handle virtually any size incident and multiple check-in stations may be used with the primary building block for data capture being PDAs, which can be widely deployed, and, since E-MAS can utilize state driver's licenses for data entry, civilian responders or victims can be easily tracked; and 6) survivability—the E-MAS system has various levels of survivability, such that even if communications are cut with the outside world, the incident commander can manage accountability from his command post. If for some reason the command post PC goes down, site commanders can still use PDAs to maintain sector or entry-point accountability. In the rare event that all PDAs fail, the system can still revert to a manual dog tag system, using the human-readable text on the credentials. It should be noted that the PDF417 bar codes on a credential represent portable data files, which travel with the person or asset being tracked and, as such, they survive and can be accessed even if central databases and communications are down.

With reference to FIG. 4, a screen dump 400 of an exemplary command computer system main screen is depicted. As is shown in FIG. 4, the screen dump 400 supplies information, such as the number of people and the type of equipment on the scene, as well as the names of the individuals on the scene. As previously mentioned, data from the command PC 124 may be sent upstream to a central dispatch, an Emergency Operating Center (EOC) or the Internet using standard communication protocols. In this manner, in the event of multiple incidents, during the same time period, a central authority may be utilized to reallocate resources, as necessary.

Accordingly, it should be appreciated that E-MAS is particularly useful for large-scale incident management. Agencies that can benefit include: state emergency management; county Emergency Operating Centers (EOCs) and emergency management; state and federal Urban Search and Rescue (USAR) teams; large municipal fire departments; mutual aid pacts; and state and federal forestry.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An incident management system, comprising:
   a check-in computer system, wherein the check-in computer system is utilized to read information from a plurality of pre-existing identification (ID) cards, and wherein the check-in computer system utilizes at least a portion of the information read to create personal, portable incident-specific credentials for persons responding to an incident; and
   a portable data terminal configured to read the personal, portable incident-specific credentials, wherein the terminal communicates with the check-in computer system to provide current assignments of personnel responding to an incident such that the personnel can be tracked.

2. The system of claim 1, wherein the information stored on the personal, portable incident-specific credentials is stored in a machine-readable format.

3. The system of claim 1, wherein the information stored on the personal, portable incident-specific credentials is stored in a text format.

4. The system of claim 3, wherein at least a portion of the information stored in a text format is visible on a surface of the personal, portable incident-specific credentials.

5. The system of claim 1, wherein the personal, portable incident-specific credential is time limited.

6. The system of claim 1, wherein the personal, portable incident-specific credential includes one or more authorizations.

7. The system of claim 1, wherein the information on each of the pre-existing ID cards is stored as a PDF417 bar code.

8. The system of claim 1, wherein the personal, portable incident-specific credential includes a photograph of an associated person.

9. The system of claim 1, wherein the portable data terminal includes a plurality of personal digital assistants (PDAs), and wherein the PDAs provide remote location credential checks and entry-point accountability.

10. The system of claim 9, wherein the PDAs transmit personnel location information to the check-in computer system for total incident coordination.

11. The system of claim 1, wherein the check-in computer system is also configured to read information from a plurality of IDs associated with a victim and utilize at least a portion of the information read to create personal, portable victim incident-specific credentials for victims at the incident.

12. The system of claim 1, wherein the personal, portable incident-specific credentials are tags.

13. An incident management system, comprising:
a check-in computer system, wherein the check-in computer system is utilized to read information from a plurality of pre-existing identification (ID) cards, and wherein the check-in computer system utilizes at least a portion of the information read to create personal, portable incident-specific credentials for persons responding to an incident;
a portable data terminal configured to read the personal, portable incident-specific credentials; and
a command computer system in communication with the terminal, wherein the terminal communicates with the command computer system to provide current assignments of personnel responding to an incident such that the personnel can be tracked.

14. The system of claim 13, wherein the information stored on the personal, portable incident-specific credentials is stored in a machine-readable format.

15. The system of claim 13, wherein the information stored on the personal, portable incident-specific credentials is stored in a text format.

16. The system of claim 15, wherein at least a portion of the information stored in a text format is visible on a surface of the personal, portable incident-specific credentials.

17. The system of claim 13, wherein the personal, portable incident-specific credential is time limited.

18. The system of claim 13, wherein the personal, portable incident-specific credential includes one or more authorizations.

19. The system of claim 13, wherein the information on each of the pre-existing ID cards is stored as a PDF417 bar code.

20. The system of claim 13, wherein the personal, portable incident-specific credential includes a photograph of an associated person.

21. The system of claim 13, wherein the portable data terminal is a personal digital assistant (PDA), and wherein the PDA provides remote location credential checks and entry-point accountability.

22. The system of claim 21, wherein the PDA transmits personnel location information to the command post computer system for total incident coordination.

23. The system of claim 13, wherein the check-in computer system is also configured to read information from a plurality of IDs associated with a victim and utilize at least a portion of the information read to create personal, portable victim incident-specific credentials for victims at the incident.

24. The system of claim 13, wherein the personal, portable incident-specific credentials are tags.

25. An incident management system, comprising:
a check-in computer system, wherein the check-in computer system is utilized to read information from a plurality of pre-existing identification (ID) cards, and wherein the check-in computer system utilizes at least a portion of the information read to create personal, portable incident-specific credentials for persons responding to an incident; and
a portable data terminal configured to read the personal, portable incident-specific credentials, wherein the terminal communicates with the check-in computer system to provide current assignments of personnel responding to an incident such that the personnel can be tracked, and wherein at least a portion of the information stored on the personal, portable incident-specific credentials is stored in a machine-readable format and a text format.

26. The system of claim 25, wherein the personal, portable incident-specific credential is time limited.

27. The system of claim 25, wherein the check-in computer system is also configured to read information from a plurality of victim IDs associated with a victim and utilize at least a portion of the information read to create personal, portable victim incident-specific credentials for victims at the incident.

28. The system of claim 25, wherein the personal, portable incident-specific credentials are tags.

29. The system of claim 25, wherein at least a portion of the information stored on the personal, portable incident-specific credentials is visible on a surface of the personal, portable incident-specific credentials.

* * * * *